US012673892B2

(12) United States Patent
Haghanifar et al.

(10) Patent No.: US 12,673,892 B2
(45) Date of Patent: Jul. 7, 2026

(54) HIGH TRANSPARENCY, HIGH HAZE NANOSTRUCTURED STRUCTURES

(71) Applicant: UNIVERSITY OF PITTSBURGH—OF THE COMMONWEALTH SYSTEM OF HIGHER EDUCATION, Pittsburgh, PA (US)

(72) Inventors: Sajad Haghanifar, Pittsburgh, PA (US); Bradley D. Pafchek, Blandon, PA (US); Paul W. Leu, Pittsburgh, PA (US); Tongchuan Gao, San Jose, CA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 6 days.

(21) Appl. No.: 18/225,825

(22) Filed: Jul. 25, 2023

(65) Prior Publication Data

US 2023/0365457 A1     Nov. 16, 2023

Related U.S. Application Data

(62) Division of application No. 16/615,458, filed as application No. PCT/US2018/035045 on May 30, 2018, now Pat. No. 11,773,010.

(Continued)

(51) Int. Cl.
| | |
|---|---|
| *C03C 15/00* | (2006.01) |
| *C03C 17/06* | (2006.01) |

(Continued)

(52) U.S. Cl.
CPC .............. *C03C 15/00* (2013.01); *C03C 17/06* (2013.01); *C03C 17/30* (2013.01); *B82Y 30/00* (2013.01);

(Continued)

(58) Field of Classification Search
None
See application file for complete search history.

(56) References Cited

U.S. PATENT DOCUMENTS

| | | | |
|---|---|---|---|
| 7,151,277 B2 | 12/2006 | Gao et al. | |
| 8,017,234 B2 | 9/2011 | Jin et al. | |

(Continued)

FOREIGN PATENT DOCUMENTS

KR     20130090593 A     8/2013

OTHER PUBLICATIONS

Haghanifar et al., Ultrahigh-Transparency, Ultrahigh-Haze Nanograss Glass With Fluid-Induced Switchable Haze, Optica (Dec. 12, 2017), 4(12):1522-1525.

*Primary Examiner* — Shamim Ahmed
(74) *Attorney, Agent, or Firm* — Carol A. Marmo; Eckert Seamans Cherin & Mellott, LLC

(57) ABSTRACT

The invention relates generally to optically high transparency and high haze structures and, more particularly, to plastic, e.g., polymer, and glass structures having a sub-wavelength texture formed on a surface thereof, which is effective to impart the optical properties of high transparency and high haze to the structures. The texture is in a grass-like or needle-like form. Additionally, the optically high transparency and high haze structures may include a transparent conductor. Furthermore, the glass structures may exhibit a self-cleaning function.

10 Claims, 19 Drawing Sheets

Related U.S. Application Data

(60) Provisional application No. 62/512,386, filed on May 30, 2017.

(51) Int. Cl.
    | | | |
    |---|---|---|
    | *C03C 17/30* | (2006.01) | |
    | *B82Y 30/00* | (2011.01) | |
    | *B82Y 40/00* | (2011.01) | |

(52) U.S. Cl.
    CPC ........... *B82Y 40/00* (2013.01); *C03C 2217/75* (2013.01); *C03C 2217/76* (2013.01); *C03C 2217/77* (2013.01)

(56) References Cited

U.S. PATENT DOCUMENTS

| | | | |
|---|---|---|---|
| 9,017,566 B2 * | 4/2015 | Lander | C03C 15/00 |
| | | | 216/49 |
| 9,028,958 B2 | 5/2015 | Mao et al. | |
| 9,199,438 B2 | 12/2015 | Bories-Azeau et al. | |
| 9,469,083 B2 | 10/2016 | Choi et al. | |
| 2007/0009709 A1 | 1/2007 | Krishnan et al. | |
| 2012/0088066 A1 * | 4/2012 | Aytug | C03C 17/02 |
| | | | 216/37 |
| 2014/0175546 A1 * | 6/2014 | Huffaker | H01L 31/109 |
| | | | 257/342 |
| 2016/0108256 A1 | 4/2016 | Yang et al. | |
| 2018/0059291 A1 | 3/2018 | Li et al. | |
| 2020/0124937 A1 | 4/2020 | Haghanifar et al. | |

* cited by examiner (a) (i)  WCA= 46° ± 1.5°          (ii) WCA= 7° ± 1.5°

(b)

| | Bare glass | OTS coated glass | Nanograss glass | OTS/silica nanostructured glass |
|---|---|---|---|---|
| Water droplet shape | | | | |
| Static water contact angle (degrees) | 42.9 ± 1.1 | 108.5 ± 0.7 | 7.4 ± 0.2 | 159.7 ± 0.6 |
| Contact angle hysteresis (degrees) | 35.5 ± 2.7 | 19.5 ± 1.7 | - | 4.9 ± 0.6 |

Fig. 11

HIGH TRANSPARENCY, HIGH HAZE NANOSTRUCTURED STRUCTURES

CROSS-REFERENCE TO RELATED APPLICATION

This divisional application claims priority under 35 U.S.C. § 119(e) to U.S. patent application Ser. No. 16/615,458, filed Nov. 21, 2019, entitled "HIGH TRANSPARENCY, HIGH HAZE NANOSTRUCTURED STRUCTURES", which is a U.S. National Stage Application under 35 U.S.C. § 371 of International Patent Application No. PCT/US2018/035045, filed on May 30, 2018, entitled "HIGH TRANSPARENCY, HIGH HAZE NANOSTRUCTURED STRUCTURES", which claims priority under 35 U.S.C. § 119(e) to U.S. Provisional Patent Application Ser. No. 62/512,386, filed May 30, 2017, entitled "HIGH TRANSPARENCY, HIGH HAZE NANOSTRUCTURED GLASS WITH FLUID-INDUCED SWITCHABLE HAZE", which are herein incorporated by reference.

GOVERNMENT SUPPORT

This invention was made with government support under ECCS1552712 awarded by the National Science Foundation (NSF). The government has certain rights in the invention.

FIELD OF THE INVENTION

The invention relates generally to structures having a sub-wavelength texture, e.g., nanostructured pattern, formed on a surface thereof, which is effective to impart optical properties of high transparency and high haze to the structures. Additionally, the high haze feature may be switchable, the structures may exhibit a self-cleaning function, and the structures may include a transparent conductor. The invention is applicable to flexible electronic and optoelectronic structures.

BACKGROUND

Light scattering is the process of changing the direction of light rays from their straightforward path. Rough surfaces scatter light to a greater degree than planar surfaces. Diffraction, refraction and reflection are the physical mechanisms in the light scattering process. As it applies to solar cells, light scattering may result in reduced reflection and an increased light path in the absorber (e.g., silicon, dye-sensitized material, gallium arsenide, and the like), which increases the absorption. This result may include several advantages, such as, reduced absorber material thickness, higher efficiency of solar cells and reduced cost.

The haze factor is a parameter to assess light-scattering efficiency of a transparent material, and is defined as the percent of diffuse, e.g., scattered, transmission to the total transmission, in accordance with the following equation:

$$\text{Haze Factor} = \frac{\text{Total Transmission} - \text{Direct Transmission}}{\text{Total Transmission}} \times 100\%$$

The diffuse transmission is the difference between total and direct transmission. In general, structures with haze factors of greater than 70% are considered high haze, and a total transmission of greater than 80% is considered high transmission.

The surface morphology of a substrate can control the transmission and haze factors. Applying a texture to the surface of the substrate is a common approach for creating a structure that exhibits both high haze and high transparency. The texture can be applied using various conventional techniques in the art, such as, sand blasting, powder blasting and acid etching. These techniques are known for use in creating textured glass referred to as "frosted glass". The textured structures formed by these techniques are larger than the wavelength of light and therefore, lack the tuneability that is required for use in advanced optoelectronic applications. Fabrication of a glass textured structure that has both haze and transparency above 80% has not been achievable based on the aforementioned conventional techniques. Additionally, as indicated, the textured glass structures produced by these techniques, typically contain large surface features that cannot be integrated with optoelectronic devices.

There has been an increasing interest in flexible electronic and optoelectronic devices which have a wide variety of applications, such as, wearable devices, flexible sensors, RF-ID tags, sensor tapes, artificial skin, and the like. Flexible electronic devices are composed of plastics, e.g., polymers. Semi-crystalline polyethylene terephthalate (PET) and polyethylene naphthalate (PEN) polymers are the two main transparent flexible substrates used in the development of flexible electronics. In general, these materials provide good resistance to solvents and a discrete tolerance to temperature, as well as intrinsic clarity that makes them suitable for integration with transparent materials, such as, indium tin oxide (ITO) and other transparent conductive oxides (TCO). TCOs are a component in thin film solar cells, which are usually placed on a side exposed to incident light, and demonstrate a combination of low electrical sheet resistance, and high optical transparency and high light trapping ability. TCOs include indium-doped tin oxide (ITO), fluorine-doped tin oxide (FTO) and aluminum-doped zinc oxide (AZO). The use of TCOs are needed to improve efficiency of thin-film solar cells by increasing light scattering and trapping.

In order to overcome disadvantages associated with conventional texturing techniques and achieve a high haze structure that is suitable for use in advanced flexible electronic and optoelectronic applications, reactive ion etching has been employed to create sub-wavelength nanostructures. The traditional processes utilizing reactive ion etching require generating a patterned metal as a mask for selective etching of an underlying glass substrate. The requirement of applying the pattern to a metal mask and subsequently transferring the pattern to a glass substrate, as compared to simply applying the pattern directly to the glass substrate, results in additional processing steps that increases the time and cost of fabrication and, in particular, large scale production.

Thus, there is a need in the art to develop sub-wavelength, textured or nano-patterned, structures that exhibit high haze and high transparency, which are suitable for use in advanced flexible electronics and optoelectronic applications. In addition, these structures should be produced using cost and time efficient methods, such as, for example, methods that provide for applying the texture or nano-pattern to the surface of the structures, i.e., absent of the need for creating a metal mask to transfer the texture or nano-pattern to the structures. A new mask-less, one-step fabrication method utilizing RIE to create structures that exhibit high haze and high transmission provides an efficient and effective method of producing flexible polymer structures and glass structures for use in flexible electronic and optoelectronic devices. Furthermore, there is a desire for the sub-wavelength, textured or nano-patterned glass structures that exhibit high haze and high transparency to provide a self-cleaning function. Moreover, there is a desire for the sub-wavelength, textured or nano-patterned polymer and glass structures to include a transparent conductor.

SUMMARY OF THE INVENTION

In one aspect, the invention provides an optically high transparency, high haze structure that includes a substrate selected from polymer and glass, having a top surface and an opposing bottom surface; and a sub-wavelength nano-structured texture having a grass-like form comprising a plurality of blades, and formed on at least one of the top surface and the bottom surface of the substrate.

The plurality of blades in the grass-like form can have a height from about 1-10 μm. The distance between each of the plurality of blades in the grass-like form can be from about 100-700 nanometers.

Each of the optically high transparency and high haze properties may be greater than 80%. In certain embodiments, each of the high haze and the high transparency properties is 90% or greater.

The structure may include a liquid of comparable index of refraction as the substrate applied thereto that is effective to switch the substrate to one optical state when the texture is filled with the liquid, and to a different optical state when the liquid is removed.

The structure may include a low surface energy passivation selected from a molecule or element deposited on the texture to impart superhydrophobic properties. The structure may include a high surface energy passivation selected from a molecule or element deposited on the texture to impart superhydrophilic properties.

In certain embodiments, one of the top and bottom surfaces of the substrate has the sub-wavelength, nano-structured texture formed thereon and the other of the top and bottom surfaces has a transparent conductor deposited thereon. The transparent conductor can be selected from metal nanowires, metal nanomesh, doped metal oxide and combinations thereof.

In another aspect, the invention provides a method of fabricating an optically high transparency, high haze structure. The method includes obtaining a substrate selected from polymer and glass, having a top surface and a bottom surface; and forming a sub-wavelength, nano-structured texture having a grass-like form comprising a plurality of blades on at least one of the top surface and the bottom surface of the substrate.

The forming of the sub-wavelength, nano-structured texture can include reactive ion etching. The etch rate can be tuned or controlled to correspondingly tune or control a resulting morphology of the sub-wavelength, nano-structured texture, and the optically high transparency and high haze of the structure.

The method may include modifying the surface of the sub-wavelength, nano-structured texture with a molecule.

In certain embodiments, the method includes adding water to the sub-wavelength, nano-structured texture structure and subsequently removing said water to interchange between a transparent state and an opaque state.

The method may further include depositing or patterning a transparent conductor on one of the top surface and the bottom surface which does not have the sub-wavelength, nano-structured texture.

BRIEF DESCRIPTION OF THE DRAWINGS

FIG. 11 includes images that show static water contact angle and water contact angle hysteresis of bare fused silica and a sub-wavelength nano-patterned fused silica structure before and after OTS modification, in accordance with certain embodiments of the invention;

DETAILED DESCRIPTION OF THE PREFERRED EMBODIMENTS

Figure 1:
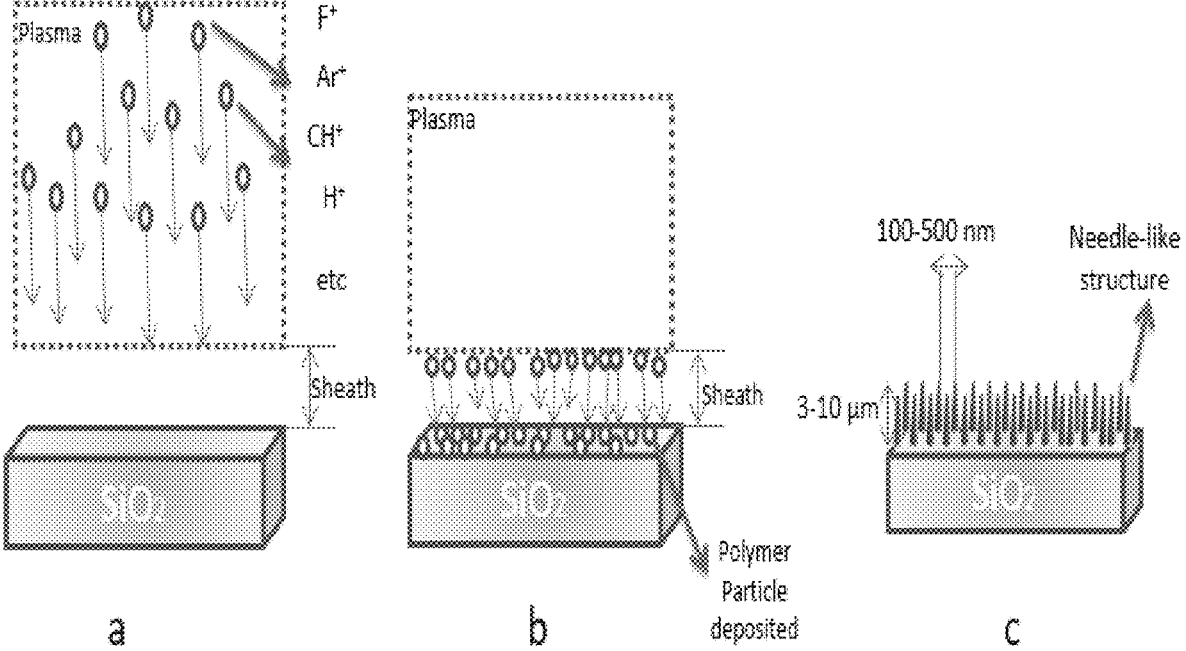
FIG. 1 is a schematic that shows a fabrication process and apparatus employing reactive ion etching to form a sub-wavelength, nano-patterned silica glass structure, in accordance with certain embodiments of the invention.

The present invention generally provides optically high haze and high transparency substrates. The invention is applicable to flexible electronic and optoelectronic structures. The structures include plastic, e.g., polymer, and/or glass substrates. These structures have a sub-wavelength, nano-structured texture, e.g., nano-pattern, applied to the substrate. As used herein, the term "sub-wavelength" means the texture has dimensions less than the wavelength of the light employed. Nano-structured texturing, e.g., nano-patterning, of the substrate increases light scattering, thereby creating a flexible, e.g., polymer, or glass structure that exhibits both high haze and high transparency. The methods for fabricating the structures include applying the texture to at least one surface of the substrate, e.g., an upper surface and/or a lower surface. The fabrication methods are conducted absent of the need to create a patterned metal mask, as is typical in conventional techniques. The fabrication methods according to the invention include a novel self-masking technique.

The structures are composed of a plastic, e.g., polymer, or glass substrate. Non-limiting examples of suitable polymers include, but are not limited to, semi-crystalline polyethylene terephthalate (PET) and polyethylene naphthalate (PEN) polymers. Non-limiting examples of suitable glass include silica, such as fused silica glass, soda-lime, lead, borosilicate and aluminosilicate glass. Transparent PET and PEN with high haze can be an important component of a wide variety of flexible electronic devices. Generally, the optically high transparency and high haze structures of the invention can be used in a wide variety of applications, such as but not limited to, light emitting diodes, traffic signs, backlit liquid crystal displays, and solar cells. With respect to solar cells, light scattering may result in reduced reflection and an increased light path in the absorber (silicon, dye-sensitized material, gallium arsenide, and the like), which increases the absorption, thereby providing several advantages, such as, reduced absorber material thickness, higher efficiency, and reduced cost.

Generally, the optically high transparency and high haze structures of the invention can be used in a wide variety of applications, such as but not limited to, light emitting diodes, traffic signs, backlit liquid crystal displays, and solar cells. With respect to solar cells, light scattering may result in reduced reflection and an increased light path in the absorber (silicon, dye-sensitized material, gallium arsenide, and the like), which increases the absorption, thereby providing several advantages, such as, reduced absorber material thickness, higher efficiency, and reduced cost.

Optoelectronic devices are typically packaged in glass to provide protection from the surrounding atmosphere and long-term durability of the devices. The high haze and high transparency glass structures according to the invention can be constructed from a variety of known glass. Fused silica is a widely used glass for applications, such as, optical windows, laser devices and imaging systems. Fused silica is known in the art as an inexpensive material that can be used to encapsulate solar cells.

A sub-wavelength, nano-structured texture, e.g., nano-pattern, is applied to one or more surfaces of the polymer and/or glass substrate. The texture can be applied to a top surface, an opposing bottom surface, or both of the top and bottom surfaces of the substrate. In general, the use of sub-wavelength textures, e.g., patterns, is known for imparting anti-reflective properties to glass substrates. Anti-reflective properties have been obtained in sub-wavelength, textured, fused silica structures with an average period of approximately 100-700 nm. Increasing the haze factor to achieve a high haze glass structure without significantly decreasing the total transmission, can be achieved by additional scattering of light.

The sub-wavelength texture applied to the surface of the structure is in a grass-like or needle-like form, e.g., web or layer. The overall thickness of the web or layer, e.g., height, and density of the texture can vary. Typically, the height of each individual grass-like or needle-like form, e.g., blade or needle, within the web or layer is substantially consistent as compared to the other blades or needles. Furthermore, the distance between each of the blades or needles in the web or layer is also substantially consistent.

Fabrication of the sub-wavelength, textured structure includes obtaining a substrate, e.g., silica glass, PET or PEN, and randomly depositing nanoscale polymer particles on the surface of the substrate. The deposited polymer particles can form a layer thereon. Suitable polymers for use in depositing the texture can vary and may be selected from those that are known in the art for this purpose. In certain embodiments, the polymer is a combination or blend of fluoroform ($CHF_3$) and sulfur hexafluoride ($SF_6$). The sub-wavelength, texture, e.g., nano-pattern, may be deposited using an etching process. Generally, the polymer employed for the texture has a "Teflon-like" composition and therefore, is etched significantly slower than the underlying substrate, e.g., silica glass, PET or PEN. The deposited polymer serves as an etching mask for the underlying substrate such that a metal mask, which is conventionally employed in etching processes, is not required. This self-masking fabrication method is employed to produce the optically high transparency, high haze structures according to the invention.

Various ion etching techniques and apparatus are known in the art. FIG. 1 shows a schematic of the mask-less, e.g., self-masking, fabrication process in accordance with certain embodiments of the invention. The process includes the use of a reactive ion etching (RIE) apparatus. As shown in FIG. 1, a fused silica glass substrate is placed in the RIE apparatus. In View (a) of FIG. 1, plasma and polymer are generated in the head space above the fused silica substrate in the apparatus. Radicals and ions bombard the fused silica glass substrate. In View (b) of FIG. 1, polymer particles are deposited on the surface of the fused silica substrate. The etching process causes short nanostructures to form on the polymer surface of the substrate. Eventually, as shown in View (c) of FIG. 1, the etched surface of the fused silica substrate has formed thereon a needle-like, e.g., grass-like, polymer texture. Additional polymer is continually deposited on the sidewalls of the grass-like nanostructures that form, to protect the nanostructure from the isotropic etch of the process. Polymer deposited on the bottom of the nanostructures is removed by a chemical sputtering effect of the accelerated ions. Appropriate combinations of the etching gases allows the etching to continuously create high aspect-ratio grass-like nanostructures during the fabrication process.

As aforementioned, each needle or blade of grass in the texture has a height from about 1-10 µm, and the distance between the needles or blades is from about 100-700 nanometers. This texture is effective to yield high haze and high transparency properties to the fused silica glass substrate.

In the self-masking process, the pressure, power and flow rate of the etching gases can be selected and varied, such as to tune or control the etch rate and the resulting morphology of the nano-patterned polymer textures created on the surface of the substrate. Thereby allowing the haze and transparency of the substrate to be tuned, controlled and maximized.

In the present invention, the sub-wavelength, nano-structured texture, e.g., nano-pattern, causes increased forward light scattering, which results in high haze and high transmission of the resulting polymer or glass structure. The texture is in a grass-like form wherein each blade has relatively similar, e.g., consistent, characteristics including shape and size, as compared to the other blades of the grass-like form. The distance between two adjacent grass blades can be approximately a few hundred nanometers, which is in the near UV to visible light wavelengths. The incident visible light is effectively scattered in the grass-like structure. The density, e.g., number of blades of grass, of the grass-like structure effects the amount of the light scattered, and the light scattering is directly related to the height of the grass-like structure. In certain embodiments, a change in the height of the grass-like structure from 1 µm to 10 µm can result in a change in the haze factor from 70% to nearly 100%, respectively, while there is a change in the total transmission from 95% to 80%, respectively.

Furthermore, the structures having a glass substrate can be fabricated such that they exhibit self-cleaning properties to prevent or reduce the accumulation of dust and dirt, which can potentially degrade optoelectronic device performance. Dust particles can significantly reduce the power conversion and extraction efficiency of solar cells and LEDs, respectively, and also affect the usability of windows, tablets, displays, and smart phones. It is known that water droplets easily roll off a self-cleaning superhydrophobic surface, while collecting dirt particles, which can clean the surface. A superhydrophobic surface is fabricated by roughening the surface using various techniques. Increasing the roughness, increases hydrophobicity. However, increasing roughness can also decrease transparency (e.g., if the roughness is greater than about 100 nm).

Known methods for producing a superhydrophobic surface can require multi-step processes that are costly and inefficient. Alternatively, the surface can be modified with low surface energy materials. Octodecyltrichlorosilane (OTS) is suitable for use in achieving superhydrophobic surfaces because a mono-layer forms easily on the glass substrate, and OTS can be used on a wide variety of glass substrates. Additionally, OTS is an inexpensive material that does not require complex equipment to make a water-repellent surface without decreasing optical transparency. In the present invention, the etched nano-grass texture on the surface of a glass substrate may include an OTS modification, e.g., an OTS layer or coating. Combination of the nano-grass texture with the OTS modification will effectively increase the static water contact angle. It has been found that a bare fused silica with an OTS modification has a 108.5±0.7 degree WCA, while a hazy glass modified with OTS has a 159.7±0.6 degree WCA. Furthermore, the structure with the OTS-modified etched nano-grass texture demonstrates transparency of 91.5%, while the haze value is more than 98.1%.

Preparation of an OTS-modified, etched nano-grass glass structure may be prepared by cleaning the surface of an etched nano-grass glass structure, applying the OTS to the clean surface, and subsequently drying the structure. In certain embodiments, the surface of the etched nano-grass glass structure is placed, e.g., immersed, in OTS solution for a period of time (e.g., about 17 minutes); transferred to a container of solvent, e.g., beaker of toluene, to remove excess OTS from the surface; removed from the container of solvent and dried, e.g., using a nitrogen pressure gun; set on a hot plate (e.g., set at about 90 degrees C.) for a period of time (e.g., about 30 minutes); transferred to toluene solution; and sonicated for a period of time (e.g., about 5 minutes).

Figure 2:
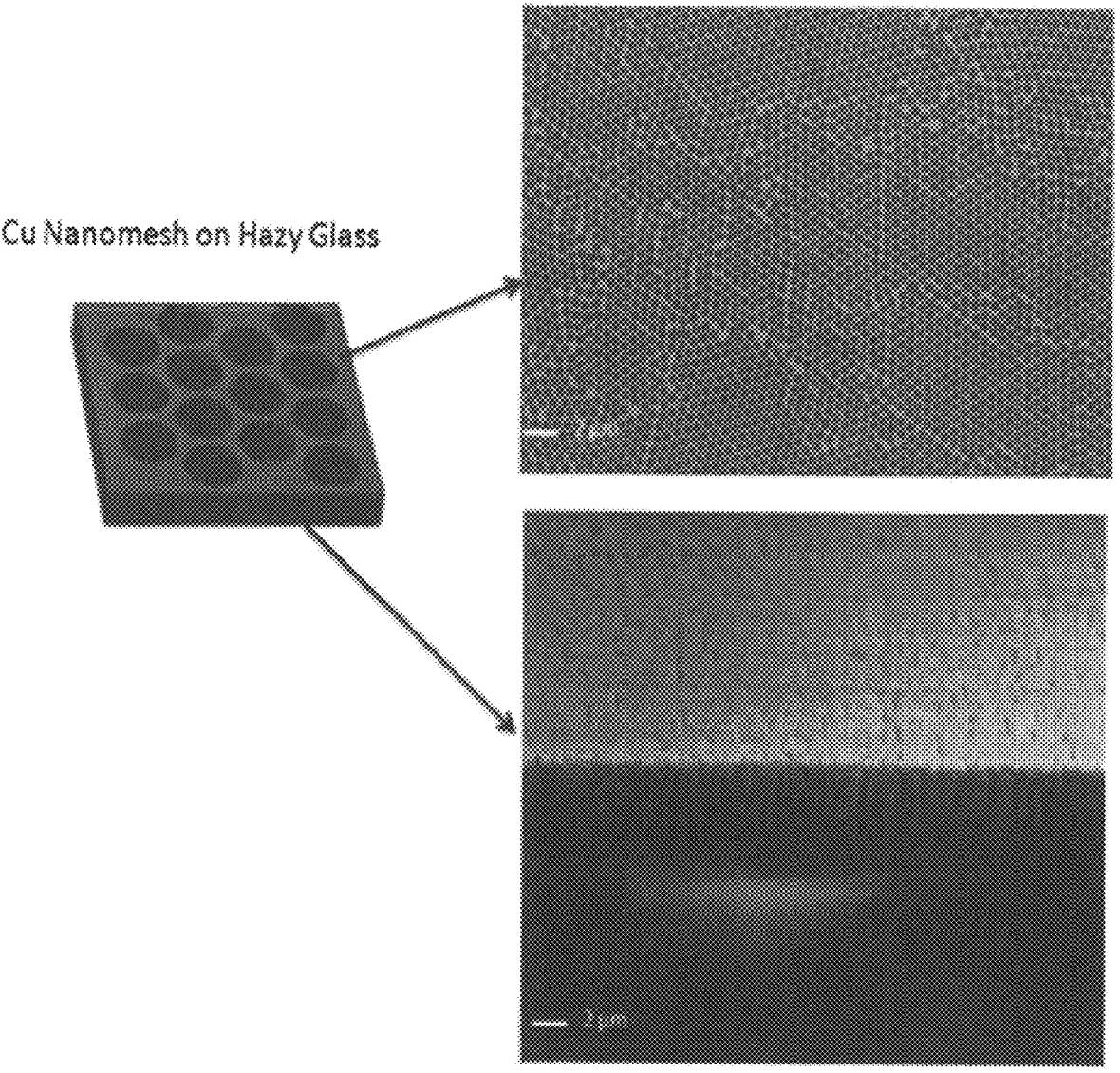
FIG. 2 includes images that show a transparent conductor fabricated by nano-grass on one side and copper nano-mesh on the opposing other side of glass substrate, in accordance with certain embodiments of the invention.

A plain substrate, e.g., fused silica, surface is an insulator. In certain embodiments of the invention, a transparent conductor is deposited on the substrate. The transparent conductor may include metal nanowires, metal nano-mesh, doped metal oxide and combinations thereof. The transparent conductor that incorporates both metal nano-mesh and nanostructured glass is provided in accordance with the invention. The transparent conductor according to the invention achieves the same characteristics as a common surface-textured TCO. A polymer or glass structure may be etched with nano-grass on one surface, and have a metal, e.g., copper, nanomesh on an opposing surface. FIG. 2 is a schematic showing a transparent conductor in accordance with certain embodiments of the invention. The transparent conductor includes a glass substrate, an etched nano-grass texture on a lower surface, and a copper nano-mesh on an opposite upper surface. In addition to the metal nano-mesh, the transparent conductor may be selected from metal nanowires, doped metal oxide and combinations thereof.

Figure 3:
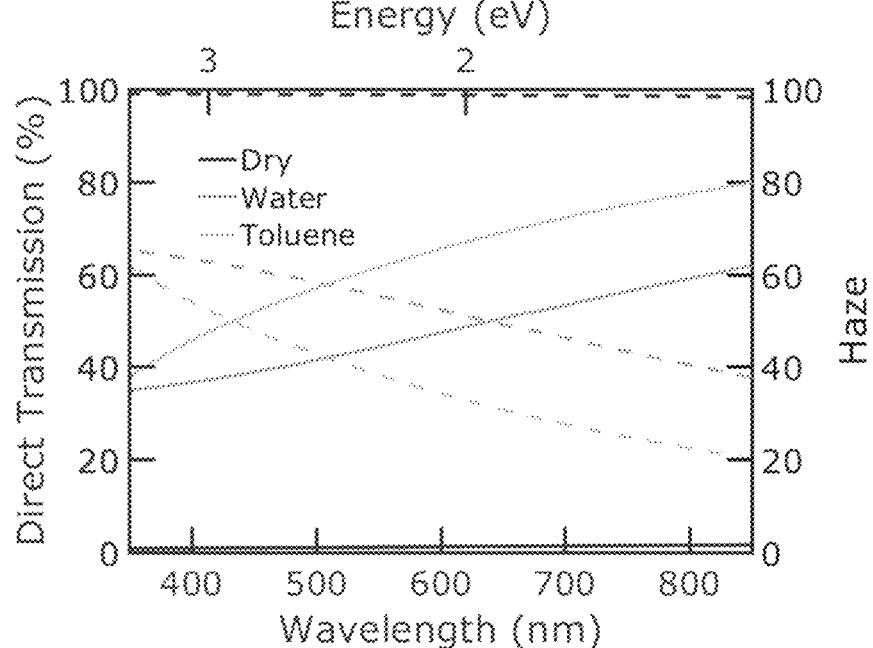
FIG. 3 is a plot that shows haze (solid lines) and direct transmission (dashed lines) as a function of wavelength for 6 μm hazy glass in dry and wet states with different liquids, in accordance with certain embodiments of the invention.
Figure 4:
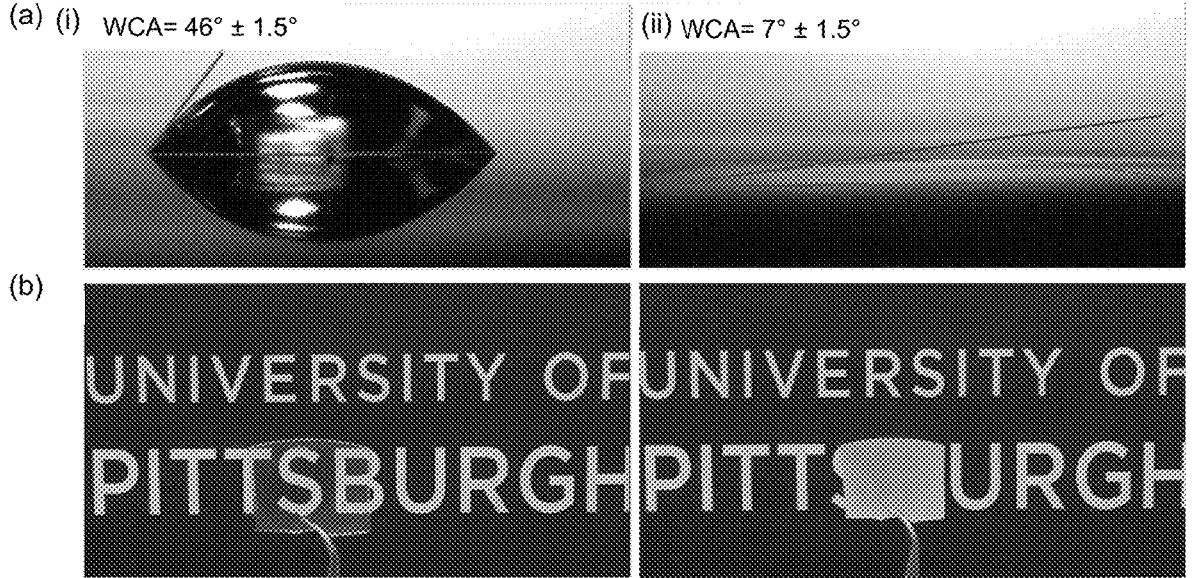
FIGS. 4(a) and 4(b) are images that show (a) contact angle of water droplet on (i) smooth fused silica and (ii) 6 μm nanograss glass; and (b) transition between transparent and haze mode of 6 μm ultra hazy glass by putting water on the glass and evaporation in 80 seconds, in accordance with certain embodiments of the invention.

In certain embodiments, the high haze, high transparency structures include the feature of switchable haze. The haze can be switched between transparent and opaque by applying, and then removing water or another liquid having an index of refraction similar or comparable to water. When water is added, the structure has low haze and a transparent state. When the water is subsequently removed, the structure reverts back to the hazy or opaque state. FIG. 3 plots the haze (left y-axis) and direct transmission (right y-axis) of the dry and wet 6 μm nanograss glass for water and toluene. The direct transmission of 6 μm hazy glass at 550 nm is 0.94%, and its haze factor is 99%. When this glass is wet with water and toluene, the direct transmission increases to 44.3% and 61.5%, respectively, while the haze decreases to 55.4% and 38.3%, respectively. The smooth fused silica is hydrophilic. The static water contact angle (WCA) of flat fused silica is 46±1.5° [FIG. 4(*a*)(*i*)]. Due to the hydrophilicity of the surface, water easily fills the empty spaces between the blades of the grass and spreads across the surface. Nanostructures enhance the hydrophilicity or hydrophobicity of a surface when the wetting is in the Wenzel state. For 6 μm nanograss glass, the static WCA is 7±1.5° [FIG. 4(*a*)(*ii*)]. Consequently, since the refractive index of the water (1.33 at 550 nm) is near that of the fused silica (1.46 at 550 nm), the glass has low haze when it is wet by the liquid. Optical images are shown in FIG. 4(*b*) of the transition between transparent and haze modes of 6 μm nanograss glass that occurs when water is applied. When the surface is wet, the water fills the gaps and the glass has low haze (0 seconds). As the water is removed (for example, from evaporation), the haziness increases, and after about 80 seconds, the glass returns to its original hazy state.

A low surface energy passivation, e.g., a molecule or element, deposited on the sub-wavelength, nano-structured texture imparts super hydrophobic properties to the structure. A high surface energy passivation, e.g., a molecule or element, deposited on the sub-wavelength, nano-structured texture imparts super hydrophilic properties to the structure.

Whereas particular embodiments of the invention have been described herein for purposes of illustration, it will be evident to those skilled in the art that numerous variations of the details may be made without departing from the invention.

EXAMPLES

Example 1

A reactive ion etching (RIE) apparatus was used to fabricate a sub-wavelength, nano-patterned silica glass structure. A fused silica substrate was placed in the RIE apparatus. Plasma and fluorine ions, argon ions, CH ions and hydrogen ions were generated in the head space above the fused silica substrate. These radicals and ions bombarded the fused silica substrate to form polymer particles that were deposited on the surface of the fused silica substrate. The etched surface of the fused silica substrate had formed thereon a needle-like, e.g., grass-like, polymer texture. The texture was effective to yield high haze and high transparency properties to the fused silica substrate.

Example 2

Figure 5:
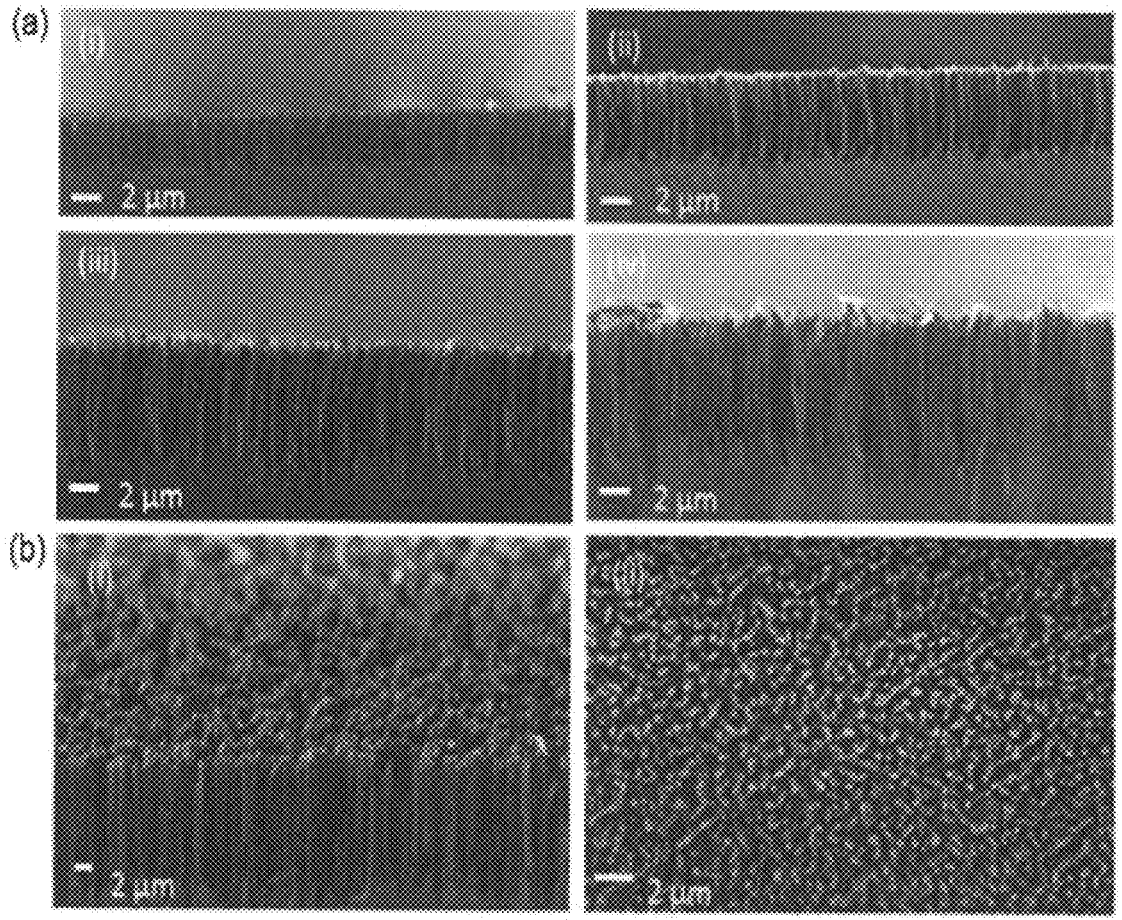
FIGS. 5(a) and 5(b) are SEM images that show sub-wavelength nano-grass-like patterns having varied thicknesses/heights on a glass substrate, in accordance with certain embodiments of the invention.

FIG. 5(*a*) shows a cross-section scanning electron microscopy (SEM) image of a sub-wavelength nano-grass textured glass structure. The nano-grass texture was fabricated by a mask-less RIE fabrication process (as described in Example 1). A fused silica glass substrate was etched by $CHF_3$, $SF_6$ and Ar at 40, 10 and 85 sccm. The total pressure of the chamber was kept at 200 mTorr and the power was 300 W. During the etching process, polymer particles were deposited on the surface of the fused silica substrate, which acted as a micro-mask and allowed the etching to create the high aspect-ratio nano-grass. Four different glass substrates were etched for 80, 150, 300 and 450 min, yielding nano-grass with heights of (i) 2.5, (ii) 4.5, (iii) 6, and (iv) 8.5 μm, respectively. The etch rate was approximately 16 nm/min for a chip with approximately 2 cm×2 cm dimension and 500 μm thickness. FIGS. 5(*b*) and 5(*c*) show 15 degree tilted and overhead view SEM images of the 6 μm nano-grass glass. The diameter of each grass blade is roughly 100-200 nm and the distance between adjacent grass blades is approximately 100 to 700 nm. The surface was etched uniformly over the entire glass substrate.

Figure 6:
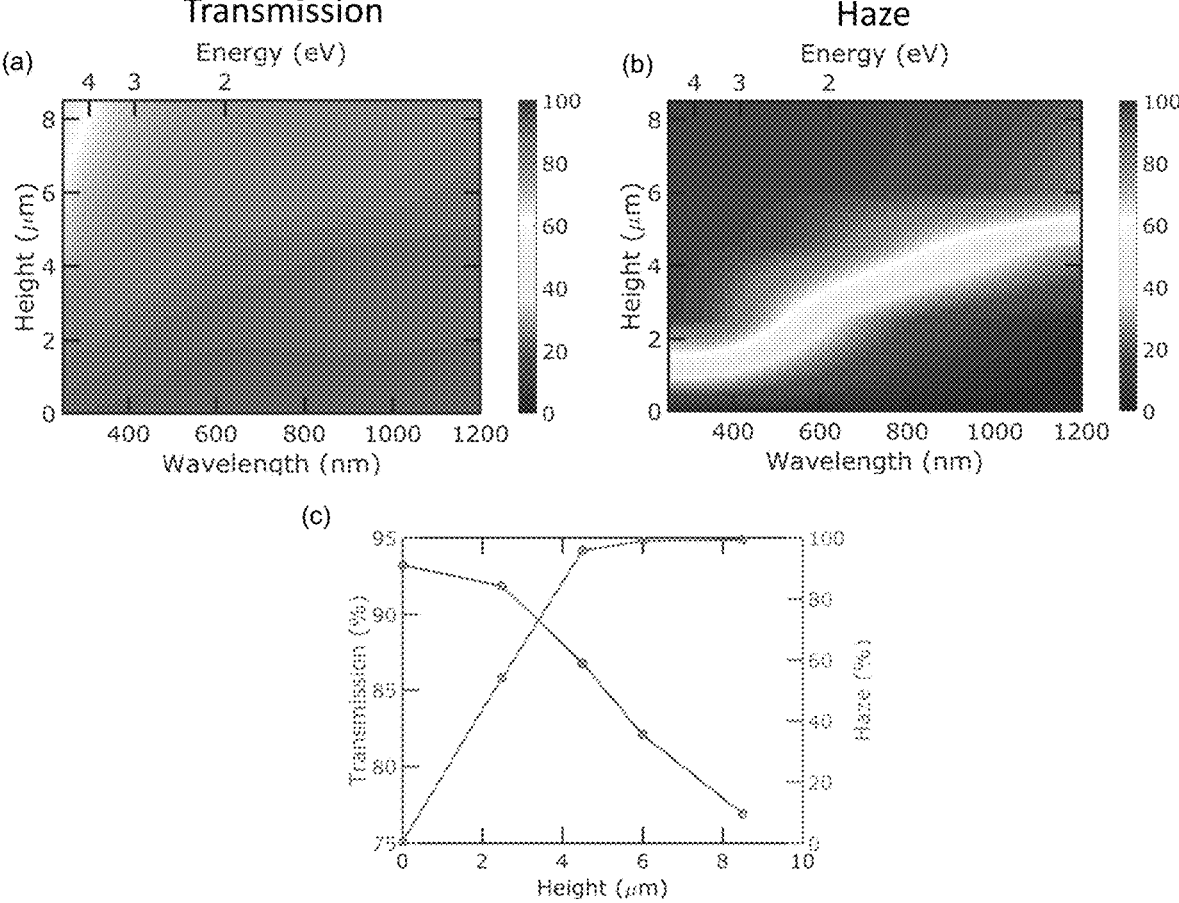
FIGS. 6(a), 6(b), and 6(c) are two images and one plot, respectively, that show the contour of (a) total transmission and (b) haze factor spectra of different height nanograss glass ranging in height from 0 to 8.5 μm over wavelengths of 250-1200 nm; (c) total transmission and haze at 550 nm wavelength as a function of nanograss height, in accordance with certain embodiments of the invention.

FIG. 6 plots the contour of (a) total transmission and (b) haze factor spectra of different height nanograss glass ranging in height from 0 to 8.5 μm over wavelengths of 250-1200 nm. For the entire spectrum, the smooth glass has a haze of less than 2.5% and a total transmission of about 93.5%. For the 2.5 μm height nanograss, the transmission spectra remains fairly flat and is an improvement over that of the smooth glass. However, as the nanograss continues to increase in height, the total transmission tends to decrease, particularly more at shorter wavelengths. In contrast, the haze tends to decrease at longer wavelengths. The scattering of near-infrared photons (wavelength 750-1110 nm) would benefit thin silicon solar cells by scattering light into the silicon. The high-haze nanograss may help to overcome silicon's low absorption near its band-gap energy. FIG. 6 (*c*) plots the results of the total transmission and haze at this wavelength as a function of nanograss height. Smooth glass has a transmission of 93.5%. By increasing the height of nanograss transmission decreases and the haze value increases. There are the range of height of nanograss which can obtain more than 90% transmission and haze at the same time.

Figure 7:
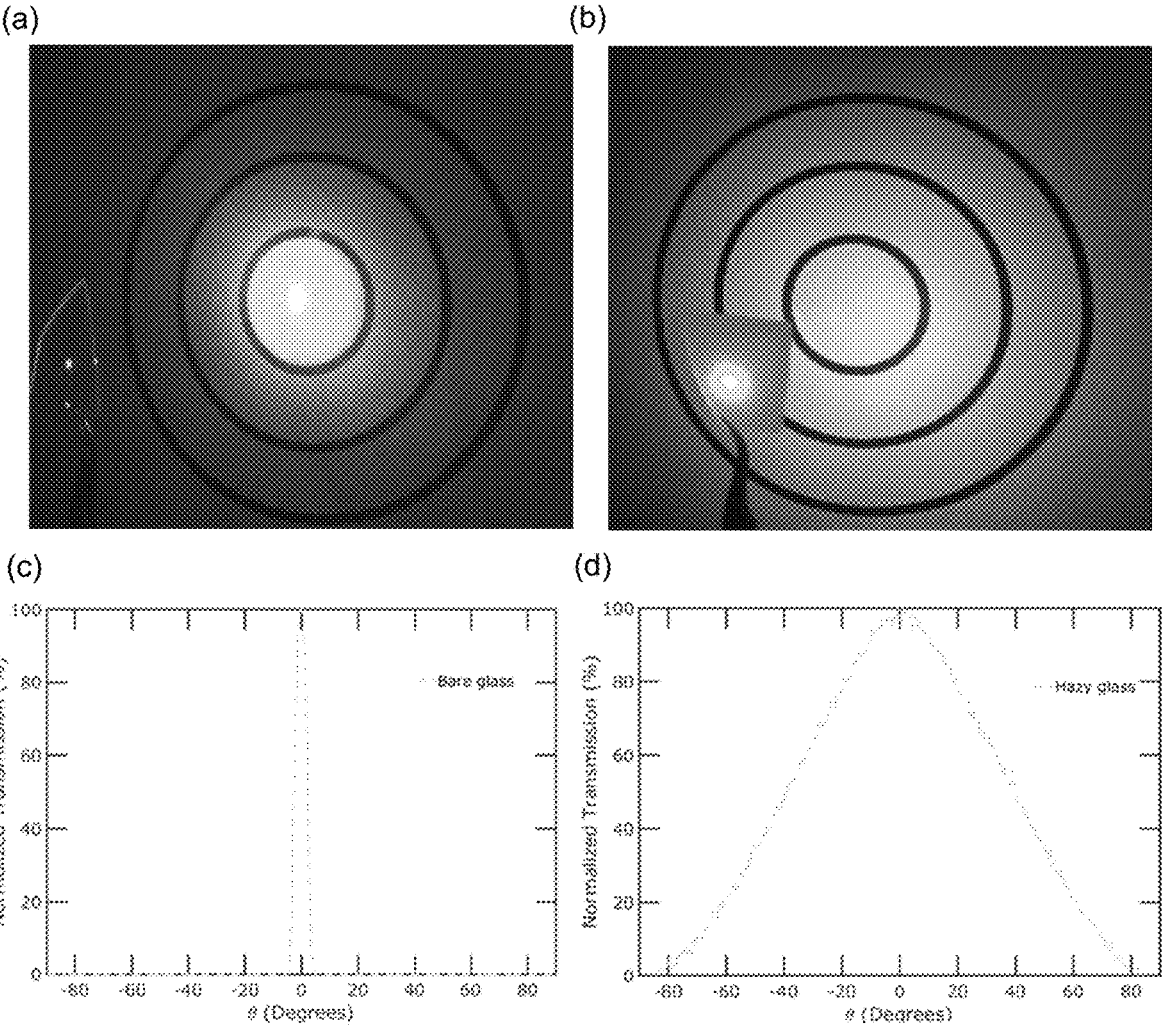
FIGS. 7(a), 7(b), 7(c) and 7(d) are two images and two plots, respectively, that show scattering ability of (a) flat fused silica and (b) 6 μm height nanograss glass, wherein the scattering ability is demonstrated by shining a laser through a sample onto a target; the rings on the target are spaced 5 cm apart; the distance between the sample and target is 30 cm; and the scattering angular distribution of transmission at a wavelength of 550 nm for (c) bare glass and (d) 6 μm height nanograss glass, in accordance with certain embodiments of the invention.

The scattering of light is shown in FIG. 7. A green laser beam with a wavelength 532 nm was used to visualize the light scattering ability of the (a) flat fused silica and (b) 6 μm height nanograss glass. The transmitted light passing through the flat fused silica shows a small luminous radius on the target with high intensity. The light scattering and haze of the flat fused silica is low. In contrast, for the 5.2 μm height nanograss, the light passing through the sample is almost completely scattered with no observation of a central point on the target. FIGS. 7 (*c*) and (*d*) shows the scattering angular distribution of transmission at a wavelength of 550 nm for bare glass and 6 μm initial height hazy glass. The scattering angle range, defined as the range of angles in which lights have more than 5% intensity of the highest intensity at 0°. The scattering angle ranges of the bare silica at wavelength of 550 nm is 7°. For the 5.2 μm height hazy nanograss glass, the scattering angle range is 146°, which shows strong scattering ability of the substrate.

Figure 8:
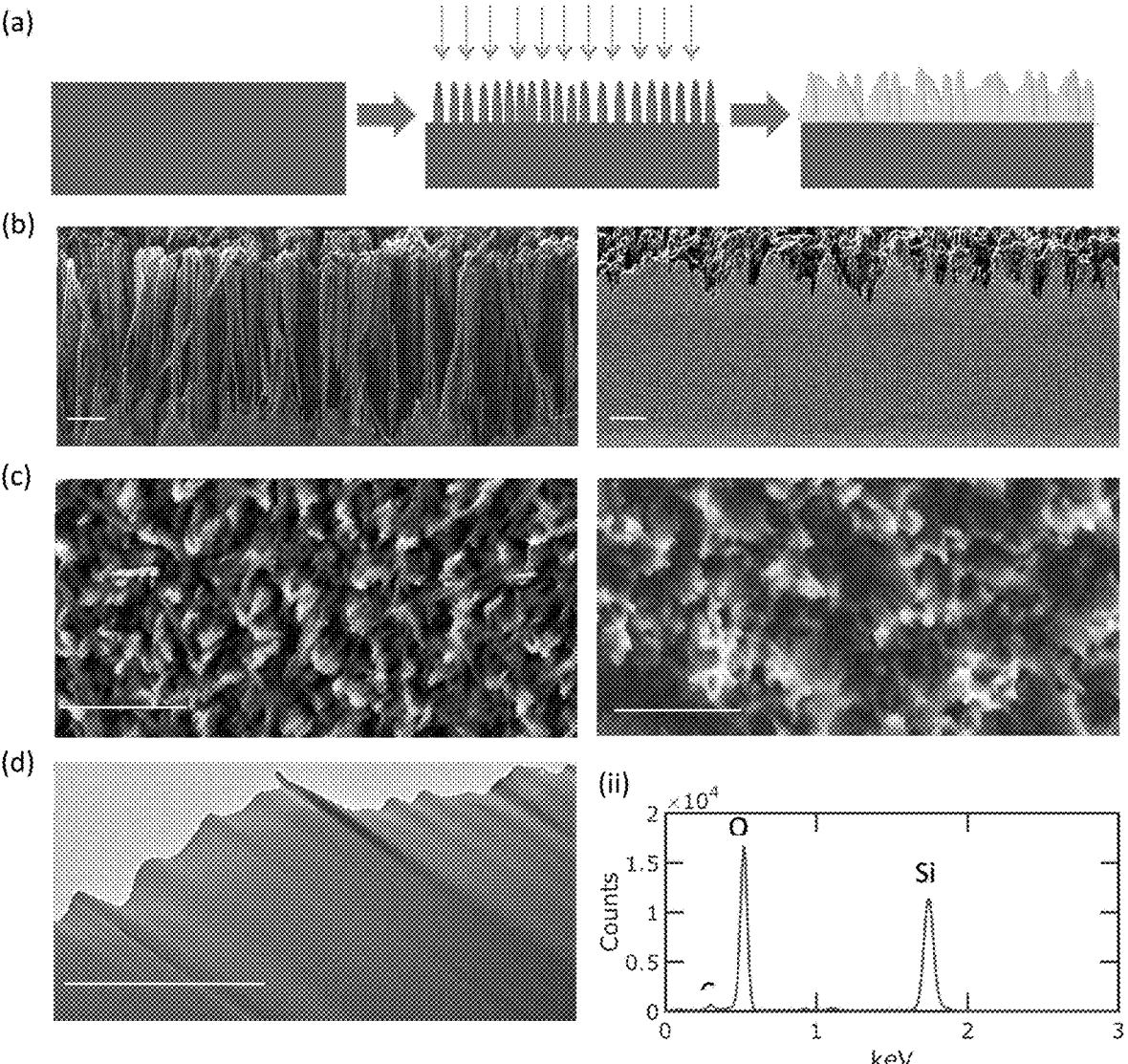
FIGS. 8(a), 8(b), 8(c) and 8(d) show (a) fabrication process of etching silica nanostructures with RIE followed by OTS coating; (b) 10 degrees tilted cross section SEM images; (c) overhead SEM images of 8.5 μm height hazy glass (i) before and (ii) after OTS modification; and (d) (i) TEM image and (ii) EDS spectrum of OTS coated hazy glass with 8.5 μm initial blade height, in accordance with certain embodiments of the invention.

FIG. 8(*a*) shows a schematic of the fabrication process. FIG. 8(*b*) shows 10° tilted cross section scanning electron microscope (SEM) images of 8.5 μm initial height hazy glass (i) before and (ii) after OTS modification, respectively. While the initial structures are about 8.5 μm long, the OTS deposits in the space between nanograss blades. In some cases where the nanograss blades are close together, the drying process merges the blades together by capillaryinduced bending. The final height of the structures after OTS coating is only about 2.2 µm long. FIG. 8(*c*) shows overhead SEM images of 8.5 µm initial height hazy glass (i) before and (ii) after OTS modification, respectively. The reduced density of structures is apparent in these images as various nanograss blades have merged together. FIG. 8 (*d*)(*i*) shows a transmission electron microscopy (TEM) image of a selected area of the 8.5 µm initial height hazy glass near the tips and FIG. 8(*d*)(*ii*) plots the energy-dispersive x-ray spectroscopy (EDS) analysis of this selected area. After hydrolysis of the chlorine groups in the OTS, the molecules attach to the surface and polymerization takes place with elimination of water. The final surfaces are terminated by methyl groups. The structures are primarily silica with some carbon from the carbon chains in the OTS.

Figure 9:
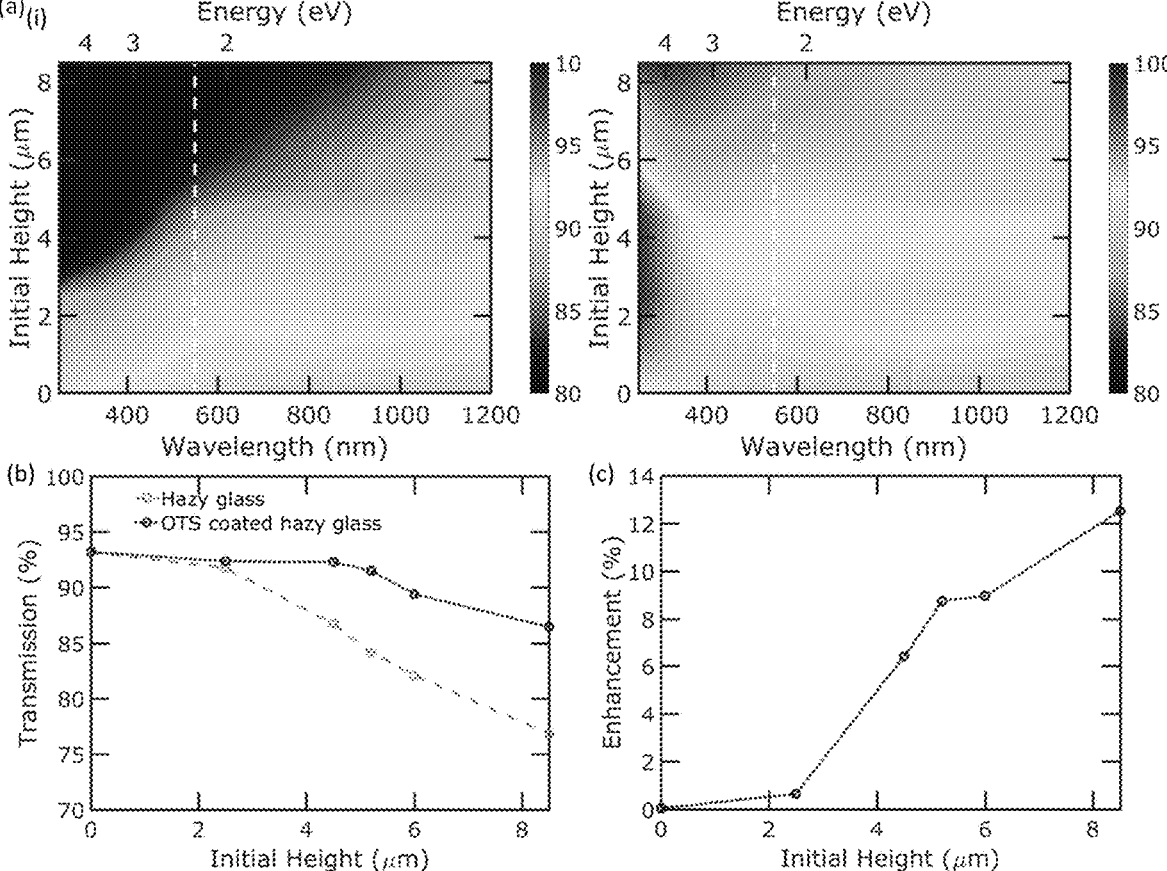
FIGS. 9(a), 9(b) and 9(c) are contour plots that show (a) total transmission (%) (i) of nanograss glass (ii) and core/shell silica/OTS nanograss glass; (b) plot of total transmission at 550 nm wavelength as a function of initial blade height; and (c) enhancement in transmission after OTS coating, in accordance with certain embodiments of the invention.

FIG. 9 shows the (a) total transmission as a function of wavelength for the nanostructured hazy glass both (i) before and (ii) after OTS coating. FIG. 9(*b*) shows the total transmission of the various structures at 550 nm wavelength. The transmission of bare fused silica is 93.5% both before and after OTS modification. On these surfaces, the OTS only forms a monolayer and has negligible change on the Transmission of the original fused silica across the entire spectrum. For the 2.5 µm nanograss glass, the transmission is initially 91.8% at 550 nm wavelength. After OTS modification, the transmission increases to 92.4%. The improvements in transmission are primarily in the wavelengths under 600 nm. Nanograss glass with initial heights 4.5 µm and above (final height over 0.9 µm) demonstrate an improvement in transparency across the entire spectrum after OTS coating compared to before. The enhancement in transmission from the OTS coating is shown in FIG. 9 (*c*) and over 8% at an initial silica nanostructure height of 5.2 µm and longer (final OTS/silica height over 1 µm). This improvement in enhancement is primarily due to the merging of nanograss blades. While the initial blades are structures of constant diameter, after OTS deposition, structures that are close together are merged together. These subwavelength structures effectively grade the index of refraction of the glass such that the antireflection and thus, transmission properties are improved.

Figure 10:
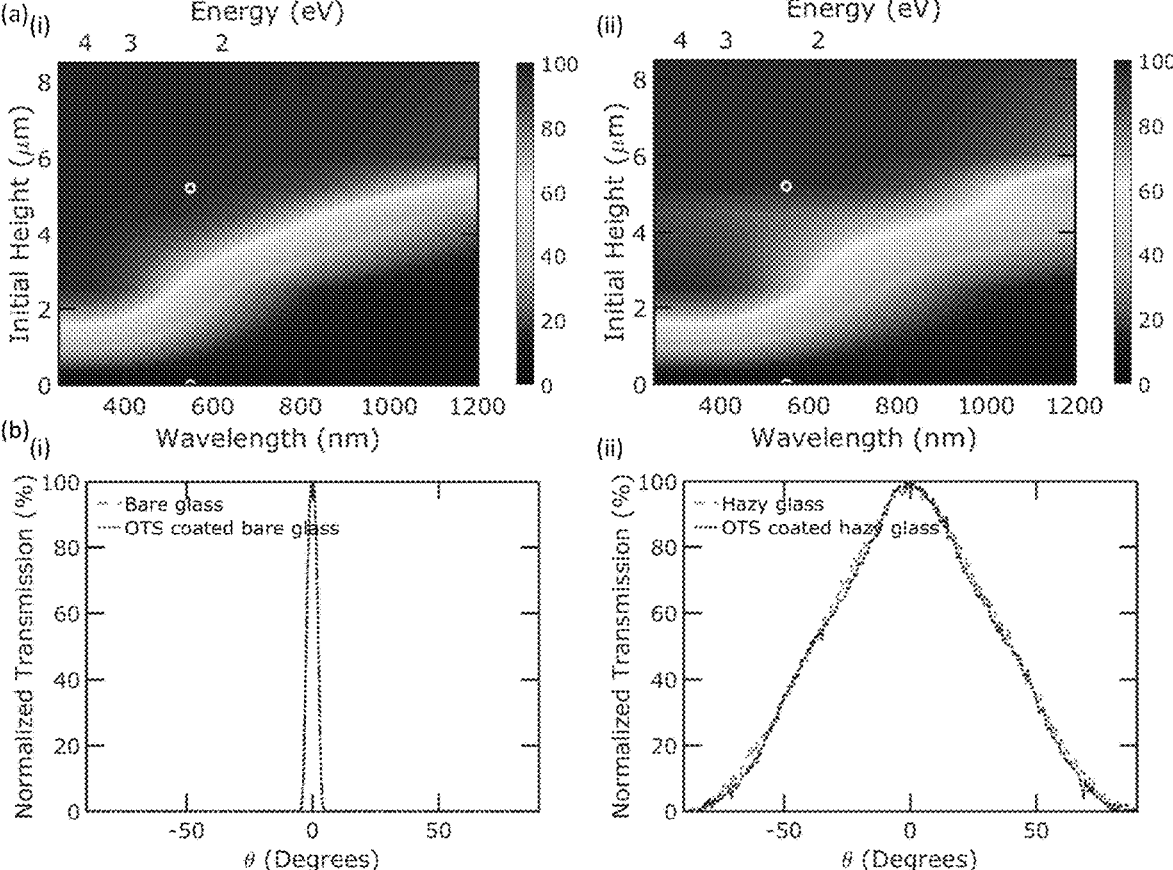
FIGS. 10(a) and 10(b) are haze contour plots of (a) (i) nanograss glass and (ii) core/shell nanograss; and (b) ADF plots of (i) smooth glass and (ii) 5.2 um height hazy glass without and with OTS layer, in accordance with certain embodiments of the invention.

FIG. 10(*a*) plots the haze of (i) the original nanograss glass, and (ii) the OTS/silica core-shell nanograss glass. The haze in the silica/OTS core-shell nanograss glass increases monotonically with height similar to that of just the silica nanograss glass, and the haze does not change much prior to and after OTS coating. The haze is near unity at wavelengths in the ultraviolet and visible, though the haze does start to drop slightly in the near-infrared. FIG. 10 (*b*) shows the scattering angular distribution of transmission at a wavelength of 550 nm for (i) bare glass before and after OTS modification and (ii) 5.2 µm initial height hazy glass before and after OTS coating. As can be seen from these plots, the OTS coating does not change the haze substantially in either sample. On bare glass, the OTS only forms a monolayer and does not change the haze as expected. On the nanograss glass, the OTS also does not change the haze significantly. While the OTS reduces the height of the structures and merges some of the silica structures together, the structures are also heterostructures now with silica nanostructures and OTS coating. These additional interfaces may compensate for the reduced scattering from reduced roughness. The scattering angle ranges of the bare silica and OTS-coated silica at wavelength of 550 nm are both 7°. For the 5.2 µm height hazy nanograss glass, the scattering angle range is 146° initially and 143° after OTS coating.

FIG. 11 shows the static WCA and hysteresis of bare glass, OTS coated bare glass, 5.2 µm height nanograss glass, and 5.2 µm initial height (1 µm final height) OTS/silica nanostructured glass. The hysteresis is the difference between the advancing and receding contact angle. The bare fused silica is hydrophilic with a WCA of 42.9±1.10. After OTS coating, the glass becomes hydrophobic as the WCA increases to 108.5±0.7°. However, the OTS coating on bare glass is not enough to make the bare glass sample superhydrophobic. In contrast, nanostructures have been demonstrated to increase superhydrophilicity and superhydrophobicity. The nanograss glass is superhydrophilic with a contact angle of 7.4±0.2° as the nanostructuring enhances the Wenzel state of wetting. After OTS coating, the wetting of the nanostructures becomes superhydrophobic with a WCA of 159.7±0.6°. The nanostructures promote Cassie-Baxter wetting where air pockets increase the apparent static water contact angle. The hysteresis is only 4.9±0.6°, which is indicative of weak water adhesion with the surface. When the OTS/silica nanostructured glass is tilted just slightly, the droplets easily roll off.

Figure 12:
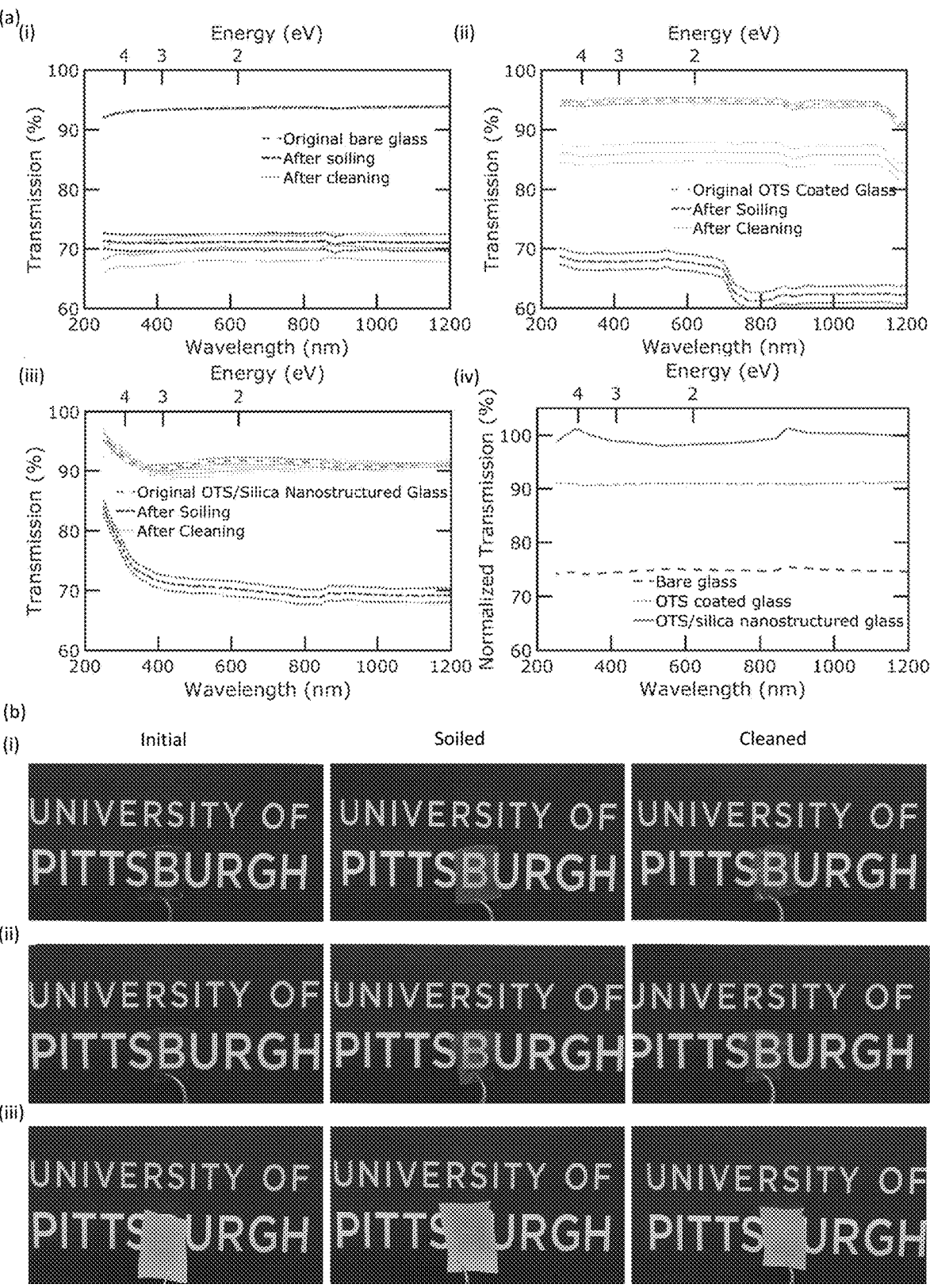
FIGS. 12(a) and 12(b) are plots and images, respectively, that show (a) total transmission plots as a function of wavelength for (i) flat fused silica, (ii) OTS coated flat fused silica and (iii) 5.2 um height OTS coated nanograss glass in three different states; (a) (iv) plots the normalized transmission of the various glass substrates showing the mean transmission after cleaning relative to the original mean transmission; and (b) optical images of (i) flat fused silica, (ii) OTS coated flat fused silica and (iii) 5.2 um height OTS coated nanograss glass in initial, soiled and cleaned states, in accordance with certain embodiments of the invention.

FIG. 12(*a*) shows the transmission spectra and (b) shows optical images of the (i) bare glass, (ii) OTS coated bare glass, and (iii) OTS/silica nanostructured glass in the original state, after soiling, and after cleaning. Three measurements were made for each sample and the mean and standard deviation for each state are also shown. For the bare glass, no improvement in transmission was observed after cleaning with water. The standard deviation becomes larger due to decreased uniformity in the transmission as the graphite tended to agglomerate into patches as can be seen in FIG. 12 (*b*). In contrast, the OTS coated bare glass shows some improvement in transmission after cleaning, but does not recover its original transmission. Finally, the OTS/silica nanostructured glass decreases similarly to the other two samples, but the transmission almost recovers back to its original state after rinsing. FIG. 12(*a*)(*iv*) plots the normalized transmission of the various glass substrates showing the mean transmission after cleaning relative to the original mean transmission. The bare glass transmission is about 75% of its original value across all wavelengths after cleaning which is about the same as what it is in the soiled state. In contrast, the soiled OTS coated bare glass recovers about 91% of its original transmission after cleaning. Finally, the OTS/silica nanostructured glass not only demonstrates the best anti-fouling properties as its transmission decreases the least in the soiled state, but self-cleaning, where the transmission is about 100% of its original value. Due to statistical variation, the transmission after cleaning is, in fact, over 100% of its original value and in some parts of the spectrum measured and slightly below 100% in others.

Figure 13:
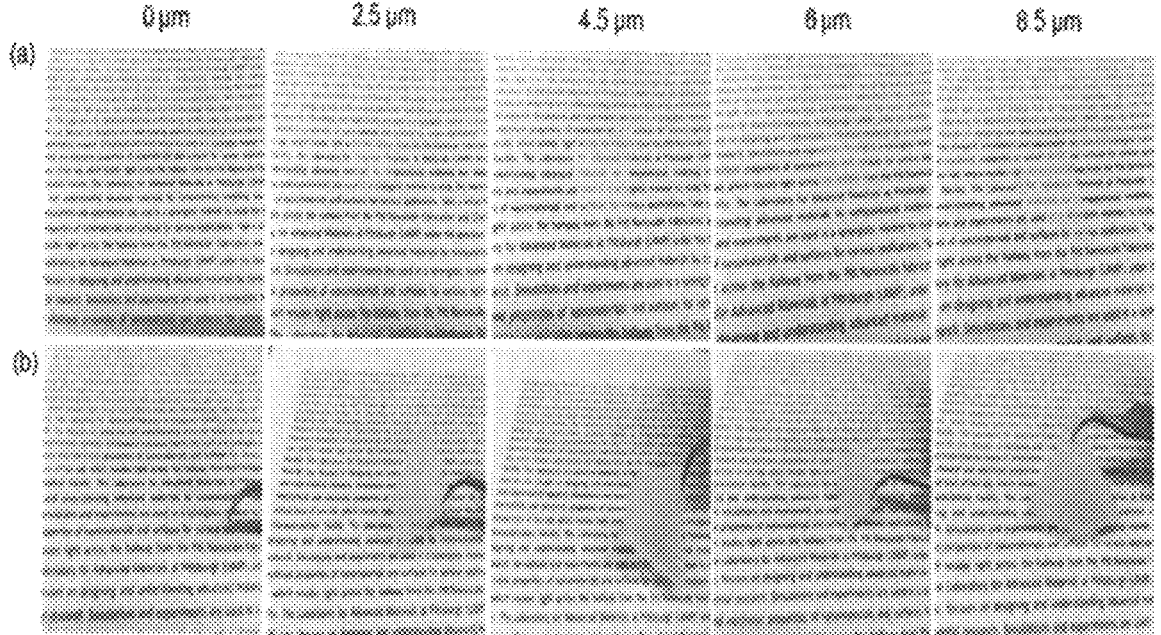
FIGS. 13(a) and 13(b) are optical images that show of smooth glass and fused silica structures with sub-wavelength nano-grass of varying heights, in accordance with certain embodiments of the invention.

FIG. 13 shows optical images of smooth fused silica and fused silica with various height nano-grass when the substrate was (a) placed directly on top of text and (b) placed about 1 cm above the text. When the substrate was placed directly on the text, the differences in visible transmission of the various samples were observed. When the substrate was held about 1 cm above the text, increasing haze with increasing height was observed. Even though the 6 µm height nano-grass glass appeared opaque, in fact, it was only the direct transmission that was low.

Example 3

Fabrication of Copper NM

Figure 14:
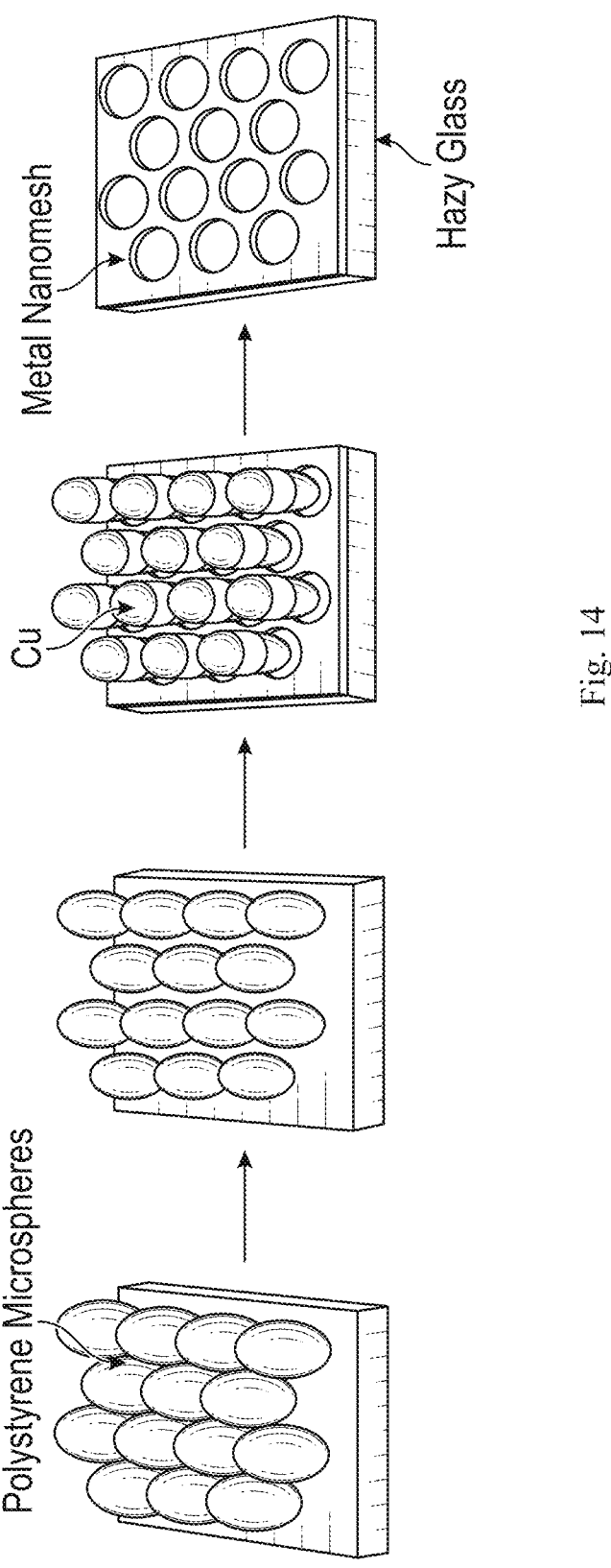
FIG. 14 includes images that show a fabrication process of a metal nano-mesh on a fused silica substrate with hazy glass nano-pattern, in accordance with certain embodiments of the invention.

A schematic of the process for preparing a transparent conductor structure is shown in FIG. 14. A petri dish was filled with deionized water until the structure samples were 1-2 mm under the surface of the water. A syringe was used to create a monolayer of polystyrene (PS) microspheres at the air/water interface. With the addition of a drop of 1 wt % surfactant (sodium dodecyl sulfate) solution, the PS microspheres assembled into a hexagonally close-packed (hcp) arrangement. Excess water was drained out using a syringe, depositing the microspheres onto the substrates at the bottom of the petri dish. Next, the diameter of PS microspheres was reduced through RIE with oxygen plasma. Electron beam evaporation at approximately $10^{-8}$ Torr was then used to deposit a 50 nm thick layer of Cu onto the substrates using a Pascal Technologies UHV Dual E-Beam Evaporator. Lastly. The PS microspheres were lifted off of the substrate through ultrasonication in ethanol at 40° C. The resulting samples had the hazy glass structure on one side and a nanomesh (NM) of copper (Cu) on the opposite side. This metal NM processing method can be scaled up by increasing the size of the vessel in which the hcp PS monolayer is created. The metal thickness, pitch, and width of the NM can be altered for specific applications by varying the evaporation time micro/nanosphere size, and etching time, respectively.

Results and Discussion:

FIG. 14 shows a NM fabrication process in accordance with certain embodiments of the invention. Cu NMs were consistently produced with 50 nm thickness and had sheet resistances in the range of 3-5 Ω/sq. The maximum transmittance of the nanomesh structure was 90.7%. Plasmonic effects could be neglected, as the only hole diameter included in the experiments were 1.4 and 3.5 μm, which is greater than any wavelength included in the transmittance spectra. This indicates that only a ~10% loss in transparency was caused by imperfections in the NM lattice.

Figure 15:
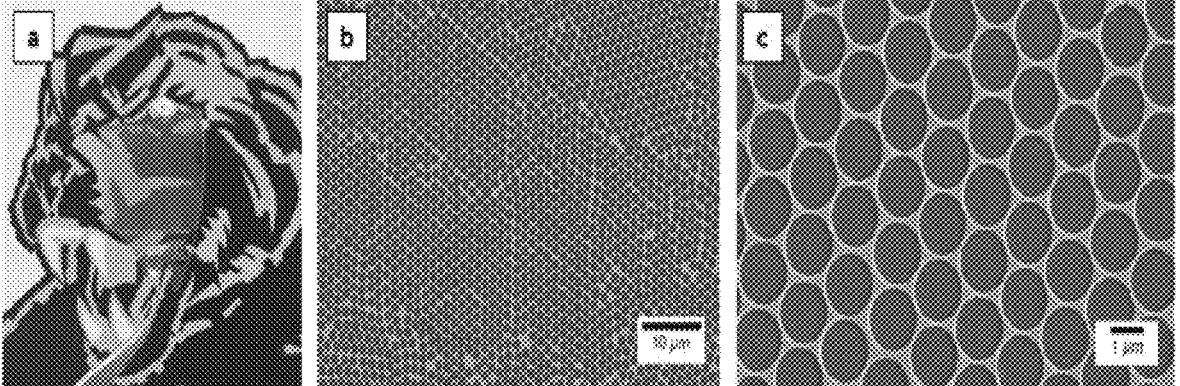
FIGS. 15(a), 15(b) and 15(c) are optical and SEM images of copper nano-mesh on an unetched fused silica substrate with polystyrene microspheres.

FIG. 15(*a*) shows an optical image of a Cu NM on an unetched fused silica sample, which illustrates the high transparency of the NM, and the SEM images in FIG. 15 (b and c) illustrate its high degree of ordering.

Figure 16:
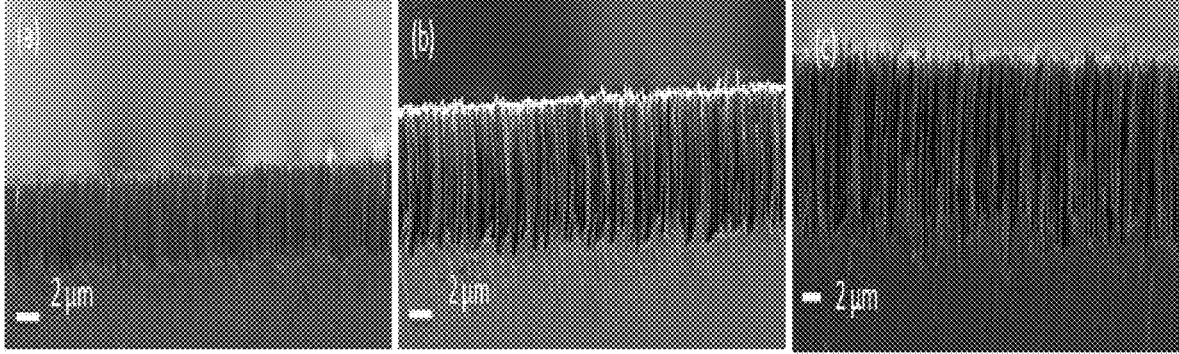
FIG. 16 includes SEM images that show fused silica structures with sub-wavelength nano-grass of varying heights, in accordance with certain embodiments of the invention.

The hazy glass was fabricated with needle-like textures having three different heights, i.e., 2.5, 4.5 and 6 μm. The SEM images these hazy glasses are shown in FIG. 16.

Figure 17:
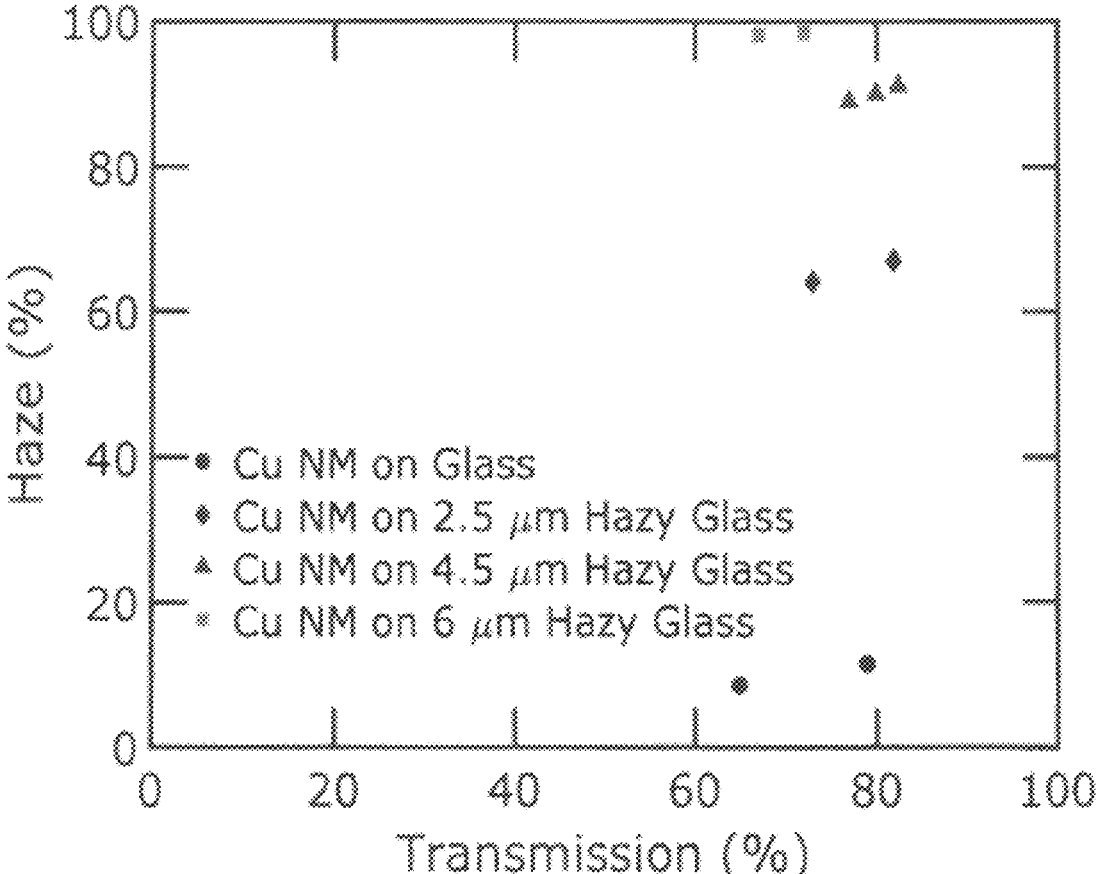
FIG. 17 is a plot of total transmission versus haze for smooth glass and hazy glass having a sub-wavelength nano-pattern of varying heights and a copper nano-mesh, in accordance with certain embodiments of the invention.

FIG. 17 shows a haze versus transmission plot for a Cu NM integrated with smooth glass and three different hazy glasses in 550 wavelength. For the Cu NM integrated with bare fused silica, the best transmission was 79% and the optimum haze was 16%. However, for the Cu NM integrated with 4.5 μm hazy glass, the transmission increased to 82% and the haze significantly increased to 93%. The haze value of 99% combining with 76% transmission was achieved when the Cu NM was integrated with the 6 μm height hazy glass.

Figure 18:
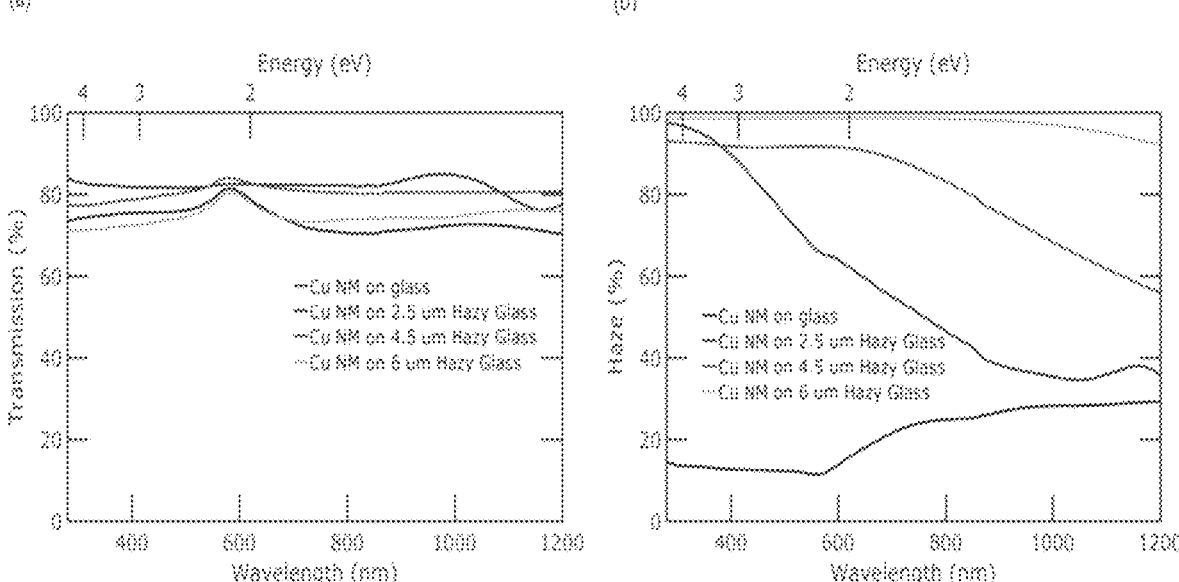
FIGS. 18(a) and 18(b) are plots that show haze factor and transmission as a function of wavelength for smooth glass and hazy glass having a sub-wavelength nano-pattern of varying heights and a copper nano-mesh, in accordance with certain embodiments of the invention.

FIG. 18 shows a transmission and haze plot of Cu NM integrated with smooth glass and three different hazy glasses. Cu NM integrated with 4.5 μm had the best transmission in the entire spectrum and the Cu NM integrated with 6 μm hazy glass had the optimum haze value over all of the wavelengths, even in near infrared region which is favorable in solar cell application.

Therefore, in this invention we introduced a transparent conductor with low sheet resistance (3-5 Ω/sq), high transparency (82% at 550 nm wavelength), and high haze (93% at 550 nm wavelength) by integrating the low cost copper nanomesh with the nanostructured hazy glass. This transparent conductor is suitable as an alternative to the currently used TCO coated structures.

Example 4

High Transparency, High Haze Nanostructured Flexible Plastic

Figure 19:
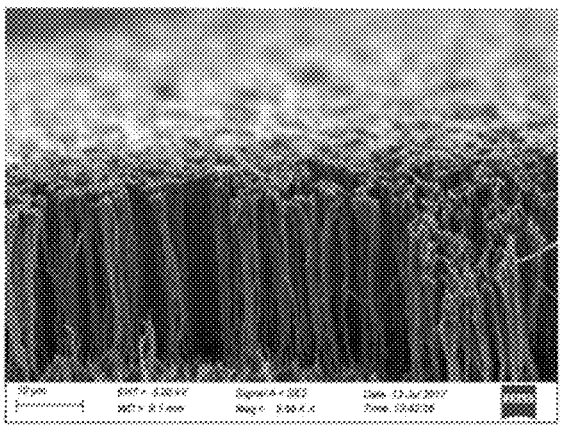
FIG. 19 shows cross section SEM images to illustrate 30 μm thickness of sub-wavelength texture on a PET substrate, in accordance with certain embodiments of the invention.
Figure 19:
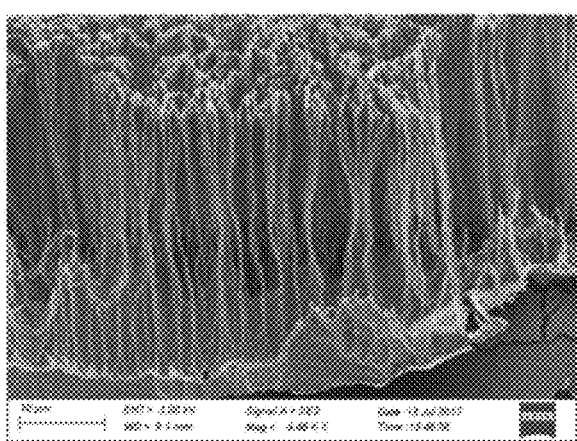

Using a combination of $CHF_3$, $SF_6$, and Ar, a nanoscale polymer web was deposited on a PET polymer substrate (as described in Example 1). FIG. 19 shows cross sectional SEM images that illustrate the grass-like form of the nanoscale polymer web, and the relatively similar characteristics including shape and size of each of the blades of grass. The distance between any two adjacent grass was approximately a few hundred nanometers, which was in the near UV to visible light wavelengths. The incident visible light was effectively scattered in the grass-like texture.

Figure 20:
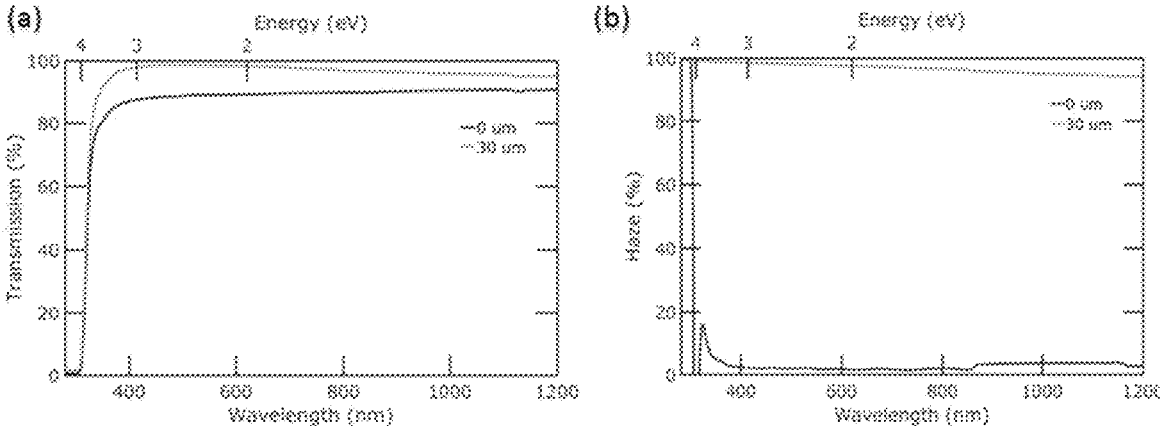
FIG. 20 shows plots to illustrate the total transmission and haze as a function of wavelength for 30 μm thickness of sub-wavelength texture on a PET substrate, in accordance with certain embodiments of the invention.

The thickness of the grass-like texture had an important effect on the amount of the light scattered, and it was seen that light scattering is directly related to the height of the grass-like texture. It was found that by changing the height of the grass-like texture from 0 μm to 30 μm, the haze factor changed from 2% to nearly 98%, while the total transmission changed from 88% to 97% at 550 nm wavelength, respectively, as shown in FIG. 20.

We claim:

1. A method of fabricating a structure that exhibits a switchable haze from transparent to opaque, comprising:
    obtaining a substrate selected from the group consisting of polymer and glass, having a top surface and an opposing bottom surface;
    depositing a plurality of nanoscale polymer particles on at least one of the top surface and the opposing bottom surface of the substrate;
    etching the plurality of nanoscale polymer particles to form a sub-wavelength, nano-structured polymer texture having a grass-like form comprising a plurality of blades on the at least one of the top surface and the opposing bottom surface of the substrate and;
    exhibiting a switchable haze from transparent to opaque, comprising:
        applying to the sub-wavelength, nano-structured polymer texture, water or a liquid having an index of refraction comparable to water, to form a transparent state; and
        removing from the sub-wavelength, nano-structured polymer texture, the water or liquid having an index of refraction comparable to water, to revert to an opaque state.

2. The method of claim 1, wherein the etching step comprises reactive ion etching.

3. The method of claim 2, further comprising depositing or patterning a transparent conductor on the at least one of the top surface and the opposing bottom surface which does not have the sub-wavelength, nano-structured texture.

4. The method of claim 1, wherein an etch rate is tuned or controlled to correspondingly tune or control morphology of the sub-wavelength, nano-structured texture, and the switchable haze from transparent to opaque.

5. The method of claim 1, further comprising modifying the surface of the sub-wavelength, nano-structured texture with a molecule.

6. The method of claim 1, wherein the plurality of blades has a height from about 1-10 um.

7. The method of claim 1, wherein a distance between each of the plurality of blades is from about 100-700 nanometers.

8. The method of claim 1, wherein the switchable haze is greater than 80%.

9. The method of claim 1, further comprising depositing or patterning a transparent conductor on one of the top surface and the opposing bottom surface which does not have the sub-wavelength, nano-structured polymer texture.

10. The method of claim 9, wherein the transparent conductor is selected from the group consisting of metal nanowire, metal nanomesh, doped metal oxide, and combinations thereof.

\* \* \* \* \*